(12) United States Patent
Park et al.

(10) Patent No.: US 12,200,840 B2
(45) Date of Patent: Jan. 14, 2025

(54) SMART MIRROR, CONTROLLING METHOD THEREOF, AND SYSTEM FOR PURCHASING A COSMETIC

(71) Applicant: AMOREPACIFIC CORPORATION, Seoul (KR)

(72) Inventors: Hyeokgon Park, Yongin-si (KR); Sooyong Shin, Yongin-si (KR); Minkyung Kwon, Yongin-si (KR); Bit Nu Ri Kim, Yongin-si (KR); Hansu Kim, Yongin-si (KR); Sung Won Yi, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 0 days.

(21) Appl. No.: 17/467,706

(22) Filed: Sep. 7, 2021

(65) Prior Publication Data

US 2022/0086991 A1 Mar. 17, 2022

(30) Foreign Application Priority Data

Sep. 16, 2020 (KR) ........................ 10-2020-0119239

(51) Int. Cl.
*H05B 45/10* (2020.01)
*A45D 44/00* (2006.01)
(Continued)

(52) U.S. Cl.
CPC ......... *H05B 47/115* (2020.01); *A45D 44/005* (2013.01); *F21V 33/004* (2013.01);
(Continued)

(58) Field of Classification Search
CPC ........ H05B 45/10; H05B 45/20; H05B 47/10; H05B 47/11; H05B 47/115; H05B 47/125; A45D 44/005; A45D 2044/007; A45D 42/10; A61N 5/0616; A61N 2007/0034; A61B 5/0059; A61B 5/441; A61H 2201/5023; A61H 2201/505; A47G 2200/08; A47G 2200/16; A47G 2200/085; F21V 33/004; F21V 23/0442; F21V 23/0471; G02B 5/08; G02B 7/182; H05N 7/185; H05N 5/2351; G06T 7/90; G06T 2207/30088; G06T 2207/30201; F21Y 2115/10; Y02B 20/40
See application file for complete search history.

(56) References Cited

U.S. PATENT DOCUMENTS 9,681,799 B1 * 6/2017 Elazar ....................... A61C 3/00
10,589,685 B1 * 3/2020 Talavera ................ A45D 42/16
(Continued)

*Primary Examiner* — Raymond R Chai
(74) *Attorney, Agent, or Firm* — Sughrue Mion, PLLC

(57) ABSTRACT

The present disclosure relates to a smart mirror, a controlling method thereof, and a system for purchasing a cosmetic. According to an aspect of the present disclosure, a smart mirror comprising: a terminal unit including a sensor capable of recognizing a user; a lighting unit including an LED capable of irradiating light to the user; and a control module capable of controlling at least one of the amount of light and the color temperature of the light irradiated from (Continued)

the lighting unit so that the skin of the user represents the light amount and the color temperature in a preset range by the light irradiated from the lighting unit may be provided.

18 Claims, 14 Drawing Sheets

(51) Int. Cl.
```
F21V 33/00      (2006.01)
F21Y 115/10     (2016.01)
G02B 5/08       (2006.01)
G02B 7/182      (2021.01)
G06Q 30/0601    (2023.01)
G06T 7/00       (2017.01)
G06T 7/90       (2017.01)
G06T 11/60      (2006.01)
G06V 20/00      (2022.01)
H05B 45/20      (2020.01)
H05B 47/115     (2020.01)
```
(52) U.S. Cl.
CPC ........... *G02B 5/08* (2013.01); *G06Q 30/0643* (2013.01); *G06T 7/0012* (2013.01); *G06T 7/90* (2017.01); *G06T 11/60* (2013.01); *H05B 45/10* (2020.01); *H05B 45/20* (2020.01); *A45D 2044/007* (2013.01); *F21Y 2115/10* (2016.08); *G02B 7/182* (2013.01); *G06Q 30/0631* (2013.01); *G06T 2207/30088* (2013.01); *G06V 20/00* (2022.01)

(56) References Cited

U.S. PATENT DOCUMENTS

| | | | |
|---|---|---|---|
| 10,652,447 B1 * | 5/2020 | Pestl | A45D 42/10 |
| 10,869,537 B2 * | 12/2020 | Yang | A45D 42/16 |
| 11,013,307 B2 * | 5/2021 | Yang | G02B 5/0263 |
| 2015/0145408 A1 * | 5/2015 | Kuroda | H05B 45/10 |
| | | | 362/135 |
| 2016/0142609 A1 * | 5/2016 | Rolston | H04N 23/74 |
| | | | 362/140 |
| 2017/0243396 A1 * | 8/2017 | Kim | G06V 40/165 |
| 2018/0278879 A1 * | 9/2018 | Saban | G06T 7/194 |
| 2019/0354331 A1 * | 11/2019 | Neugarten | G06F 3/0482 |
| 2020/0333934 A1 * | 10/2020 | Pestl | H04N 5/2257 |
| 2021/0042807 A1 * | 2/2021 | Charraud | G06Q 30/0641 |
| 2021/0358181 A1 * | 11/2021 | Suzuki | H04N 21/41 |
| 2022/0192346 A1 * | 6/2022 | Mouizina | G06T 11/60 |
| 2022/0284827 A1 * | 9/2022 | Garcia | G09B 19/0076 |

* cited by examiner

[FIG. 1]
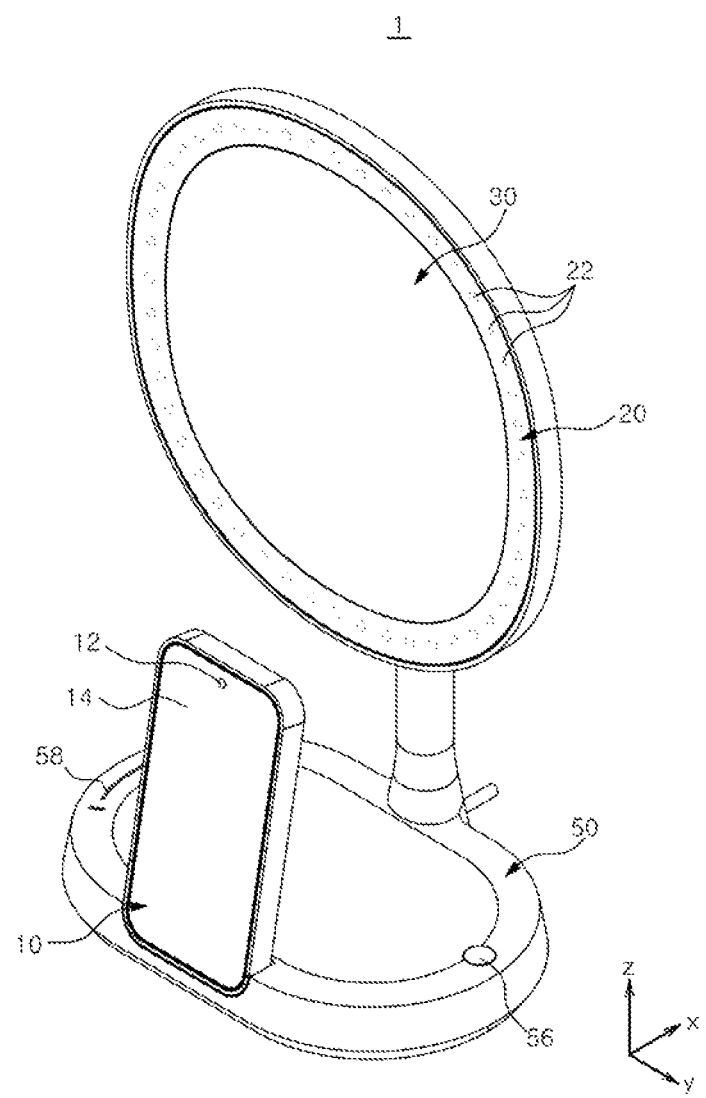

【FIG. 2】
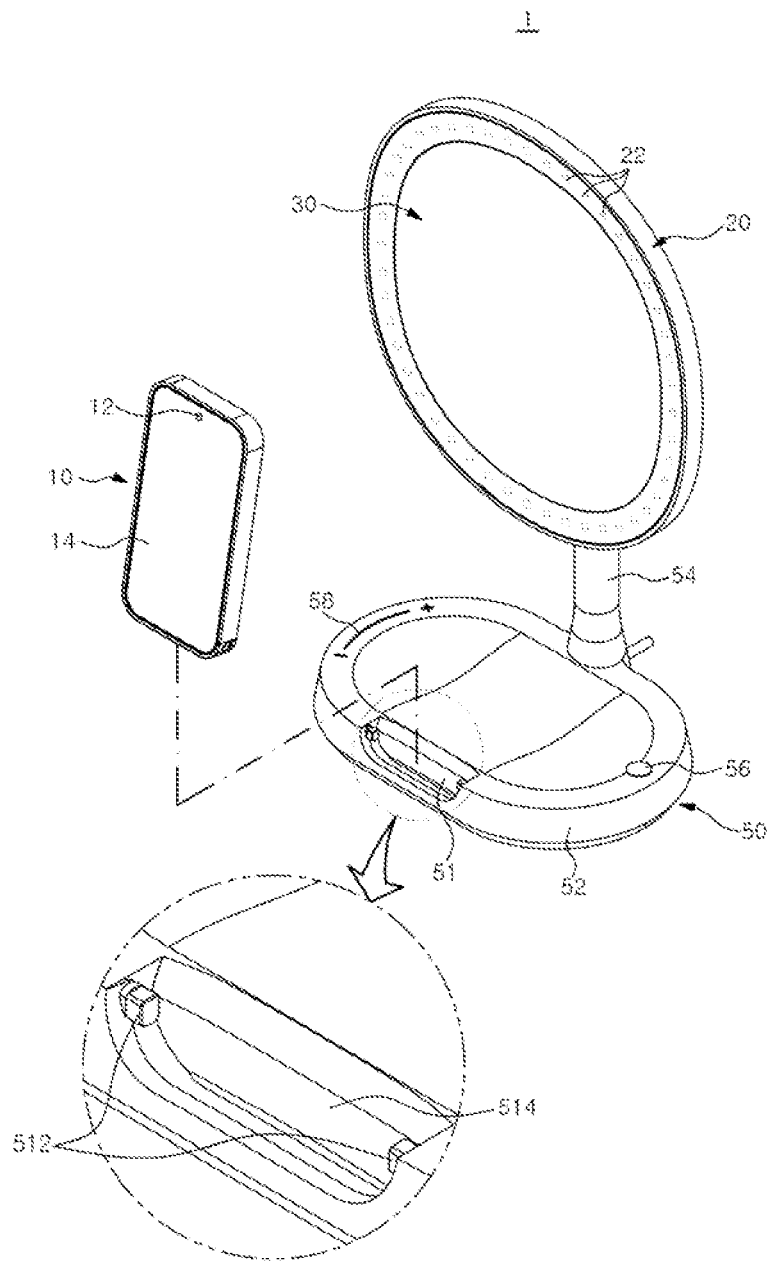

[FIG. 3]
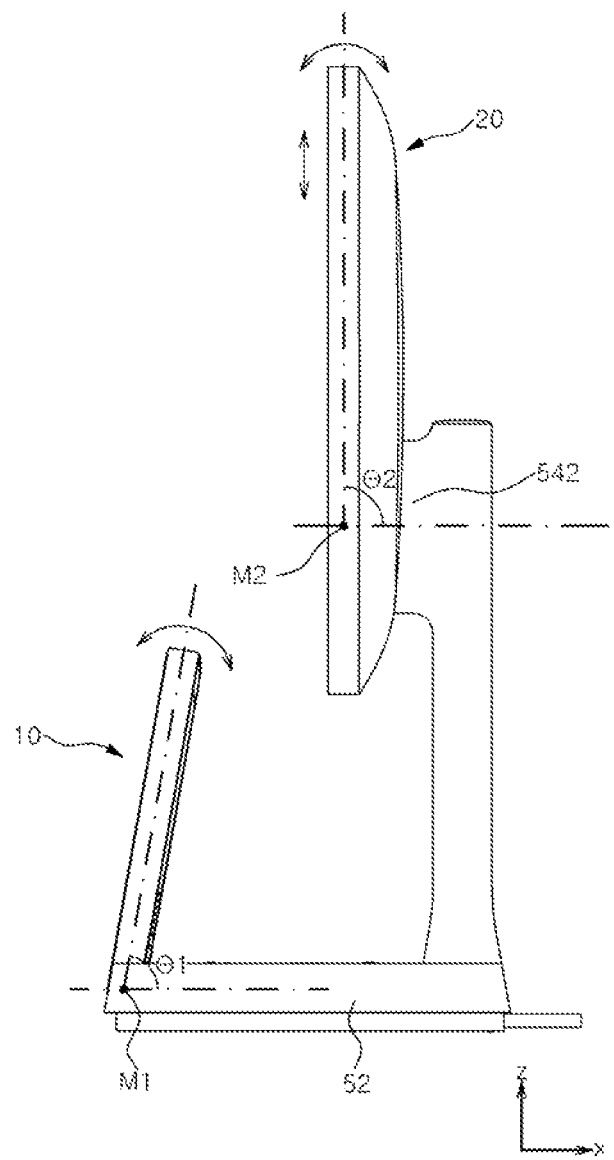

[FIG. 4]
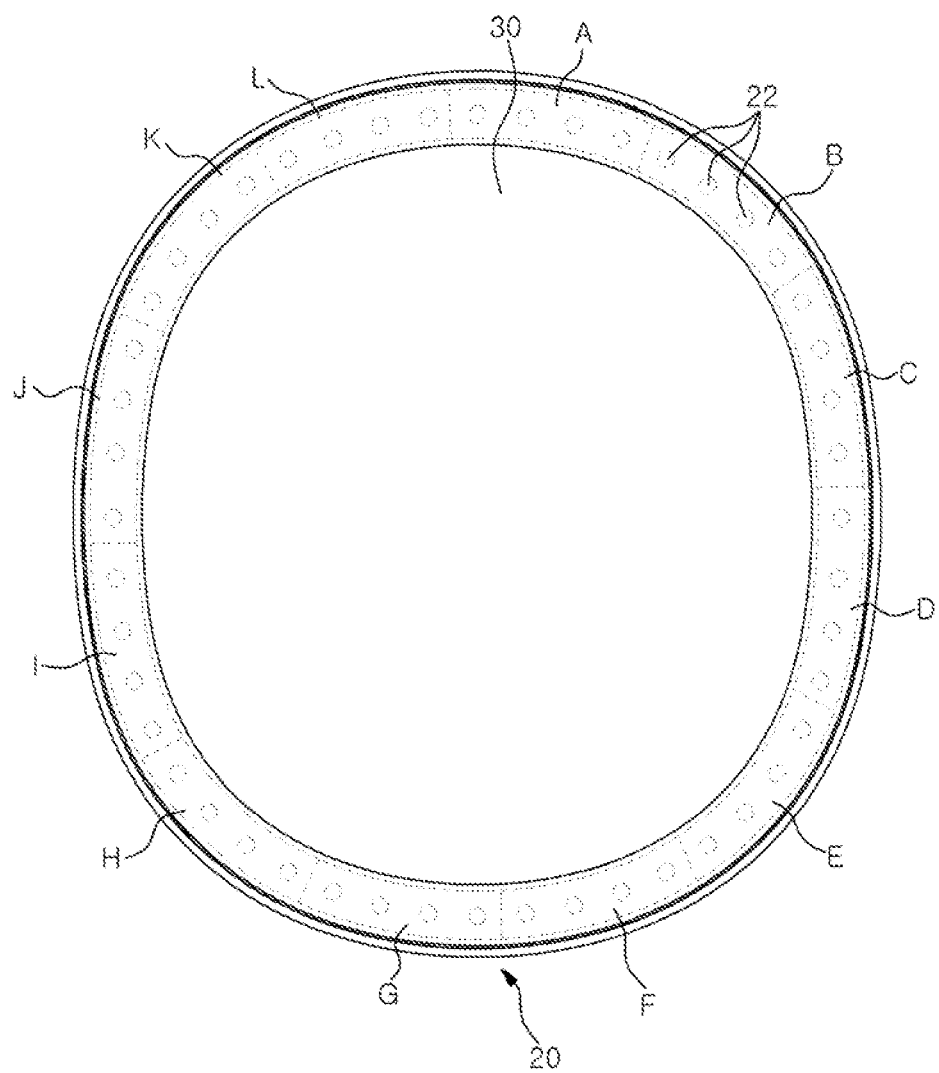

[FIG. 5]
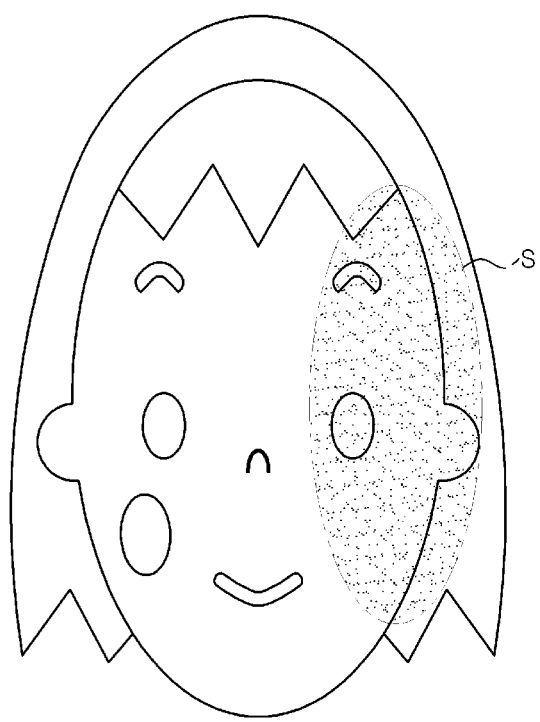

[FIG. 6]
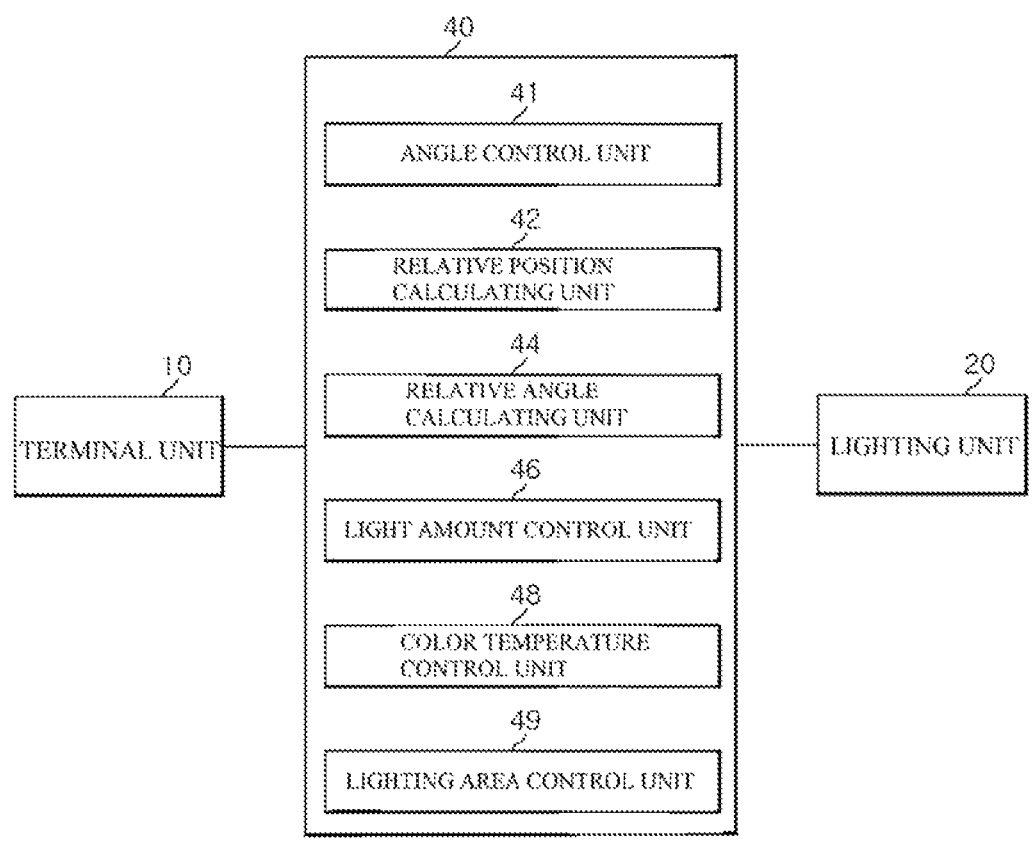

【FIG. 7】
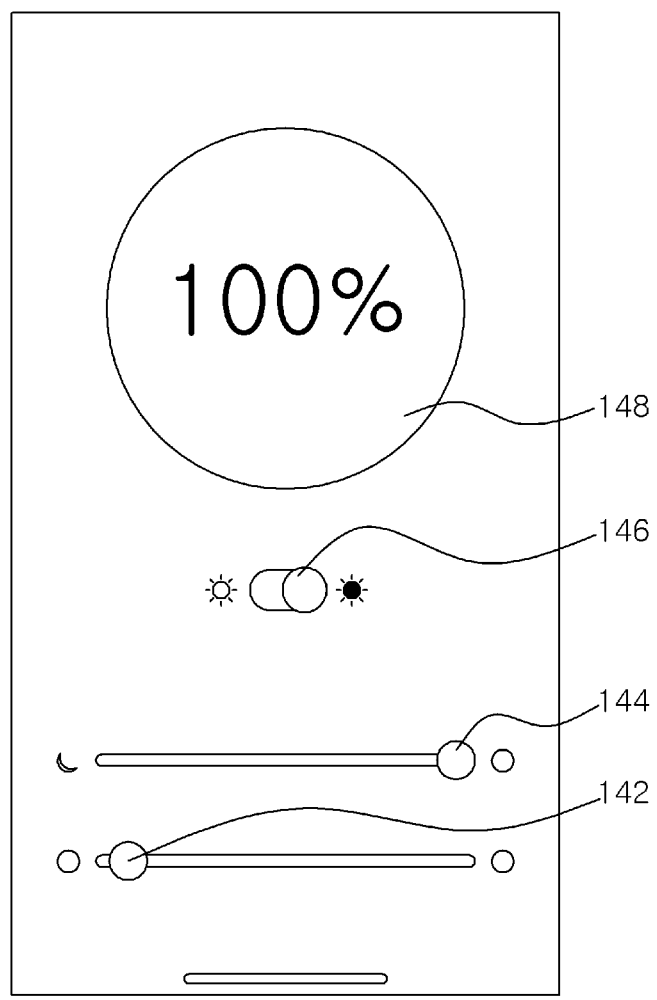

[FIG. 8]
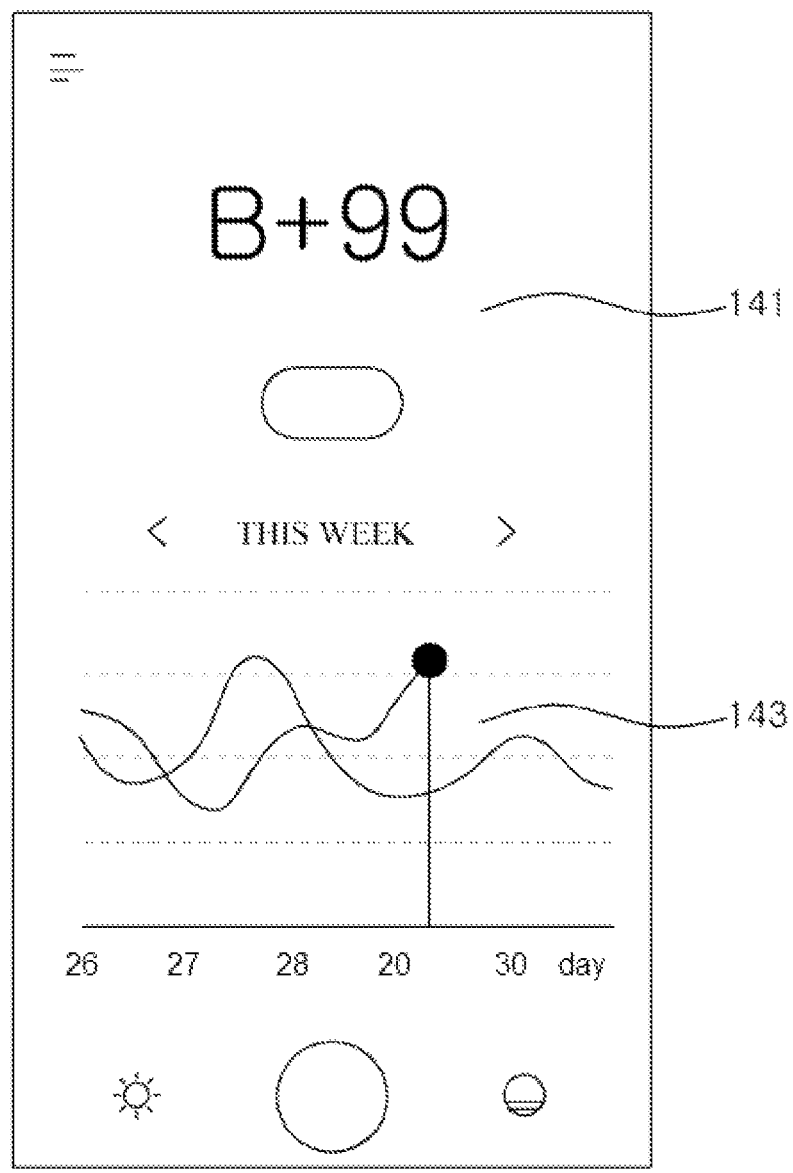

[FIG. 9]
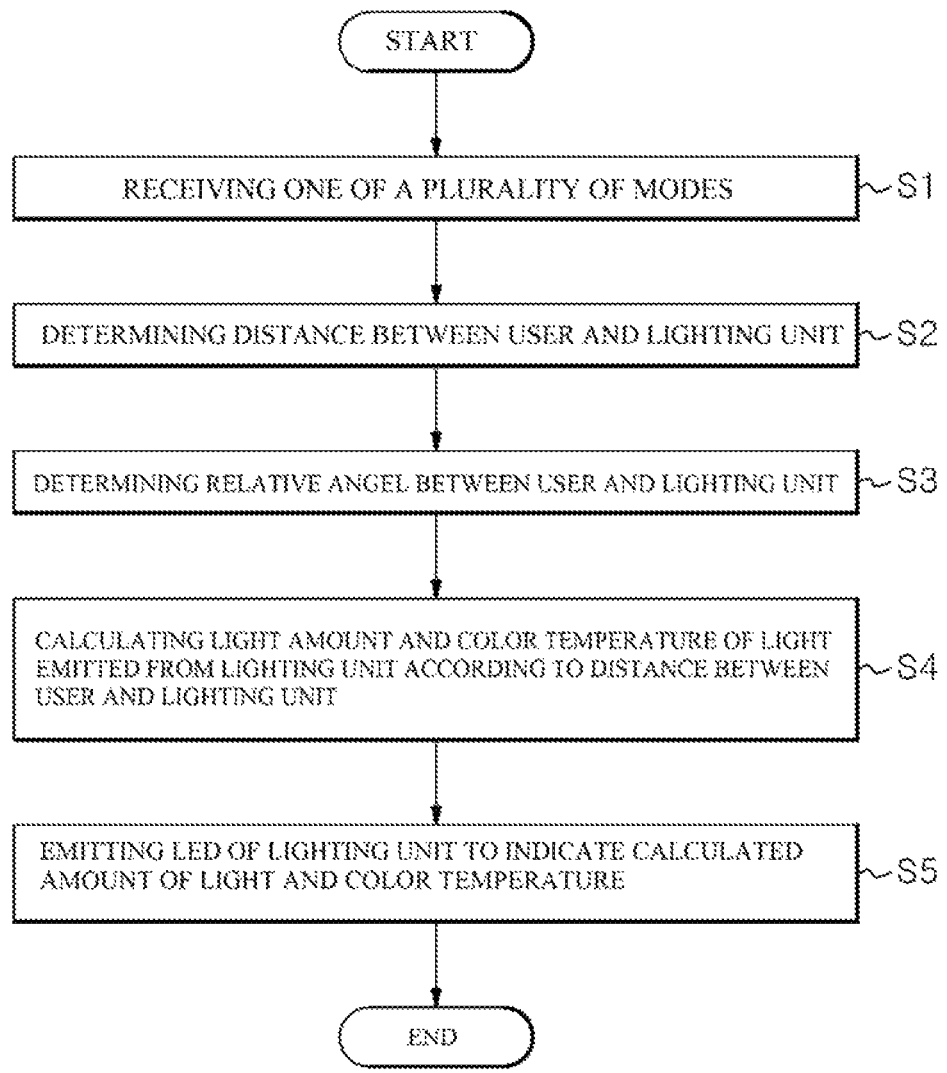

[FIG. 10]
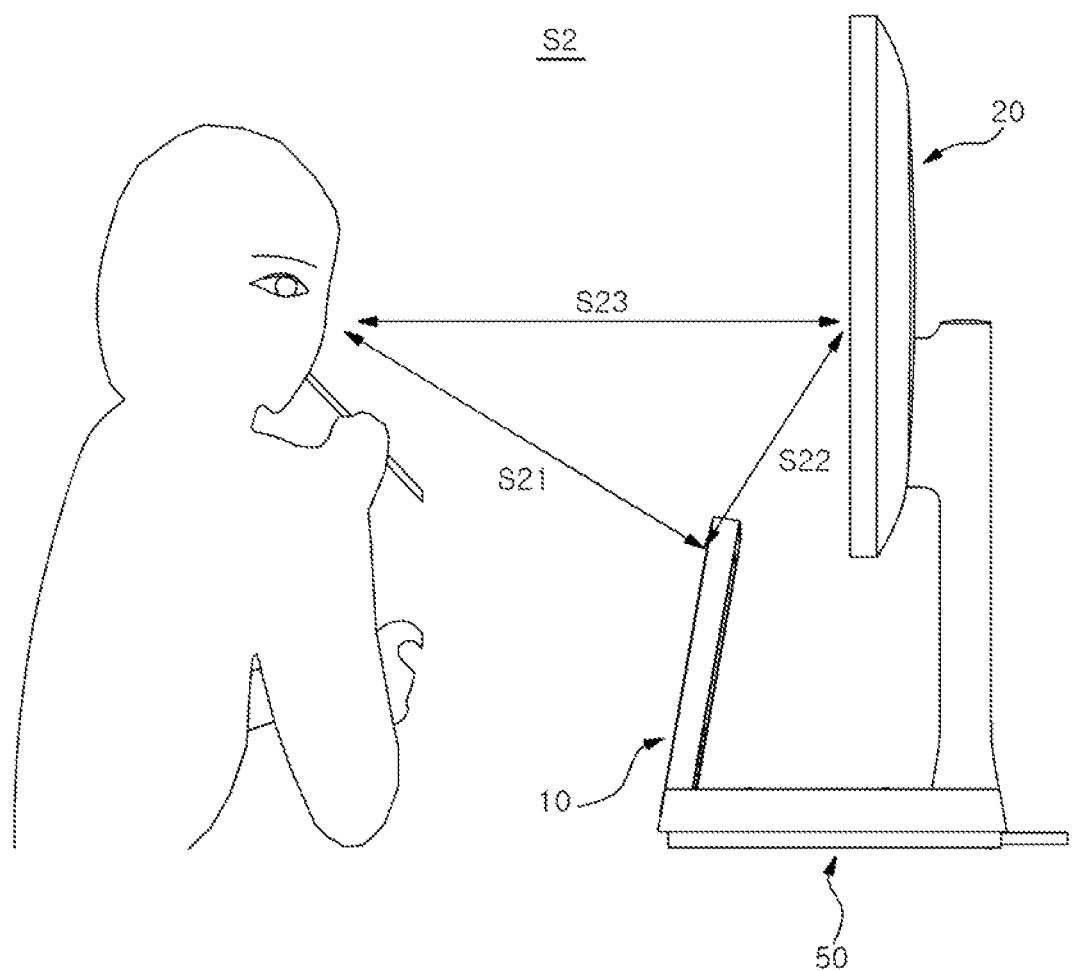

[FIG. 11]
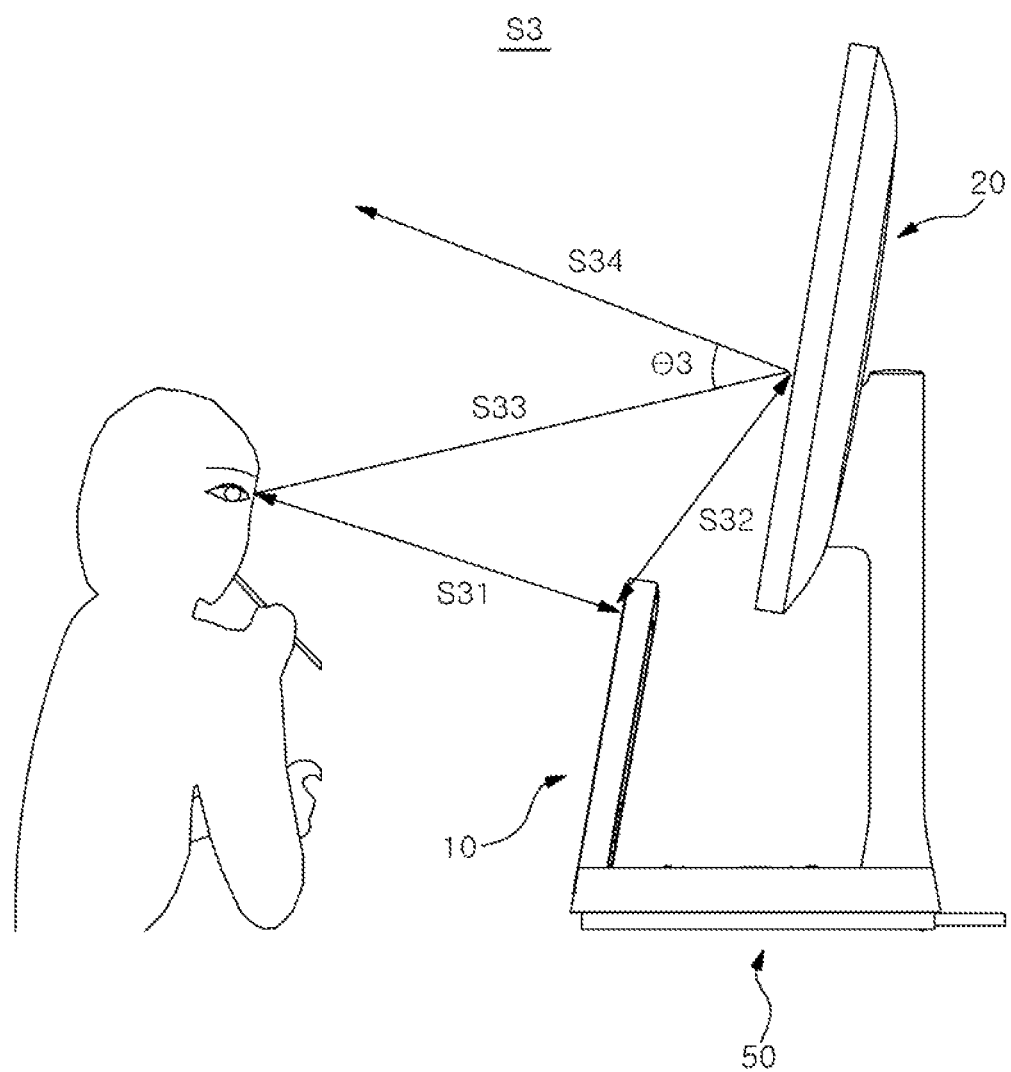

[FIG. 12]
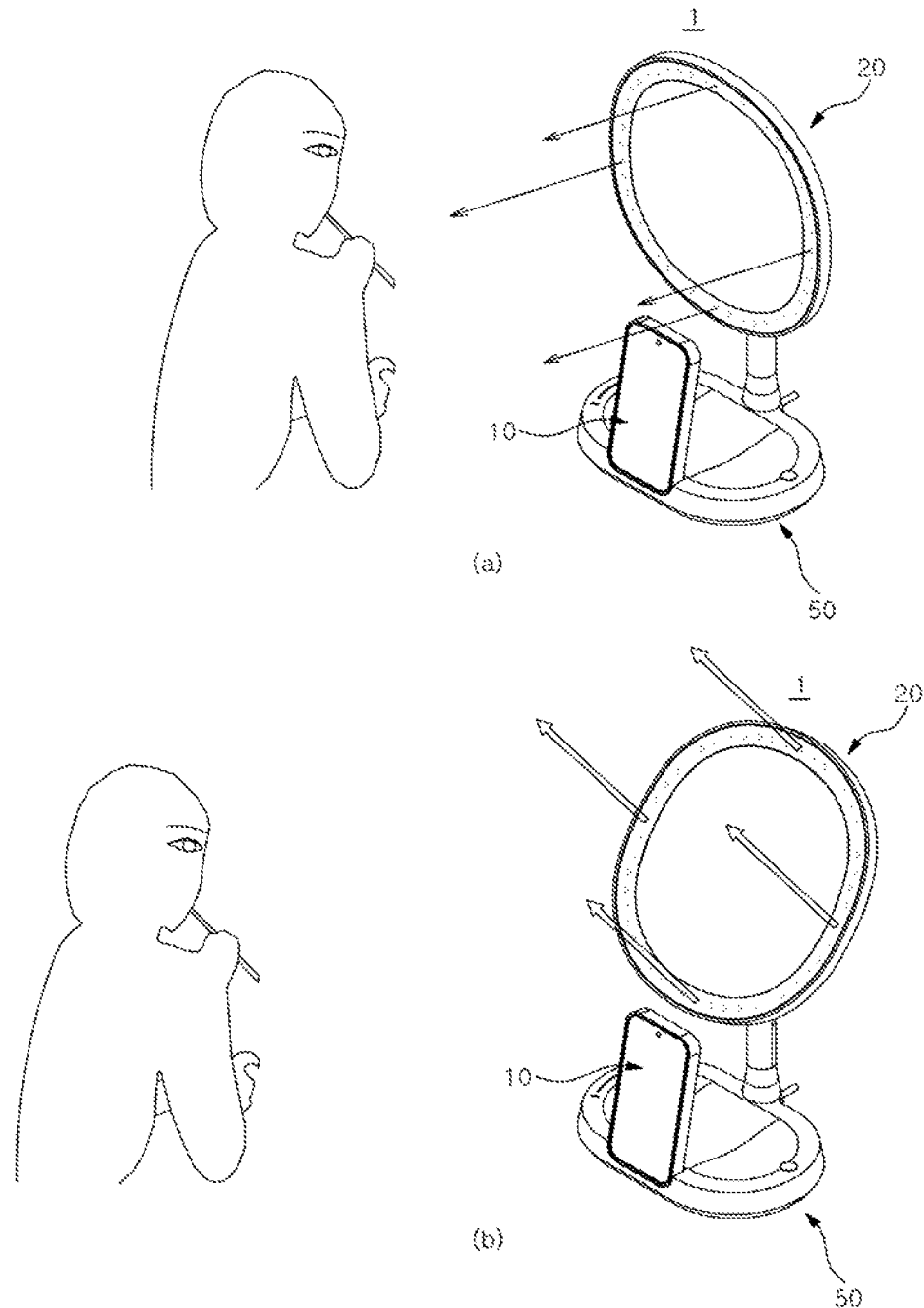

[FIG. 13]
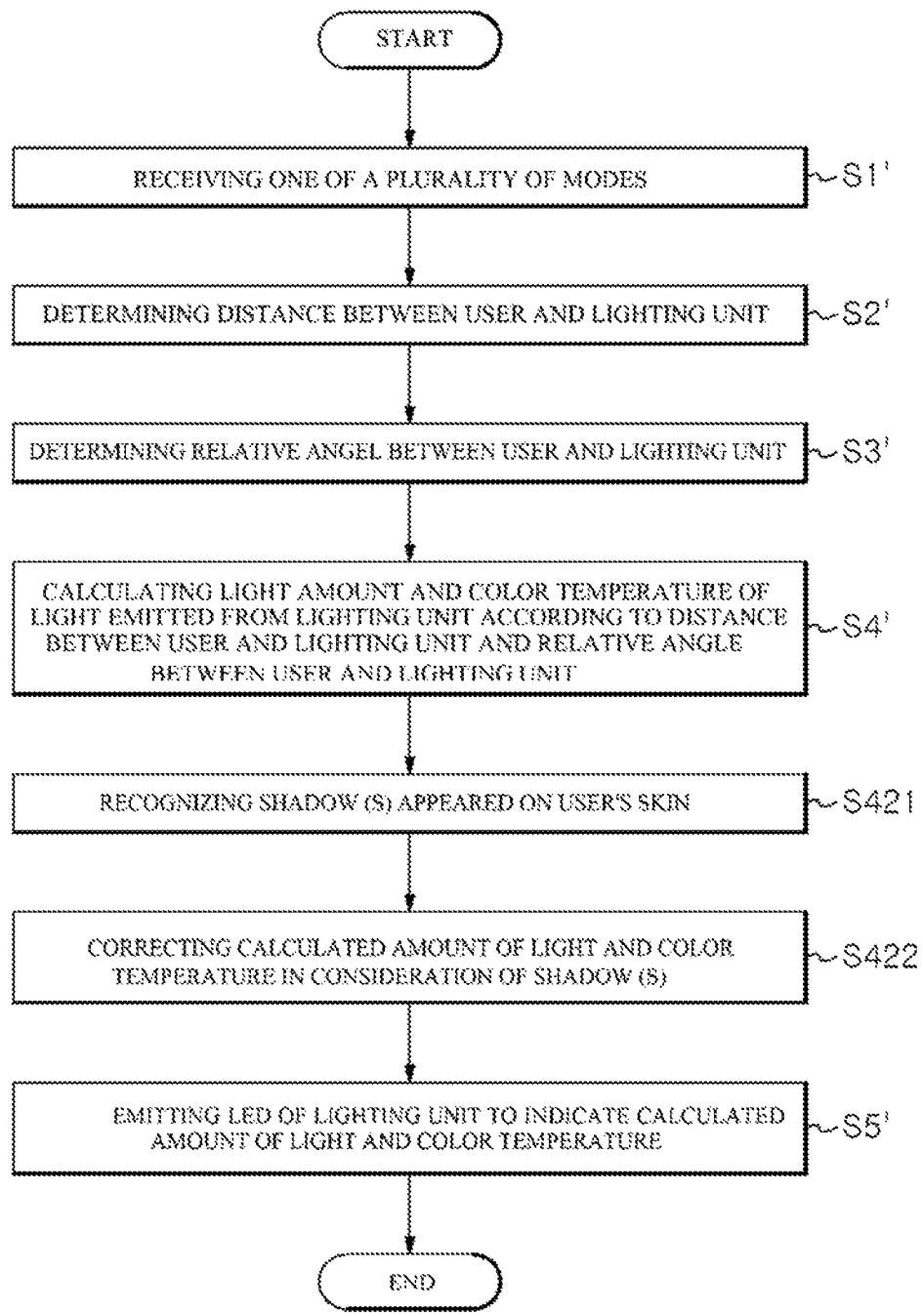

[FIG. 14]
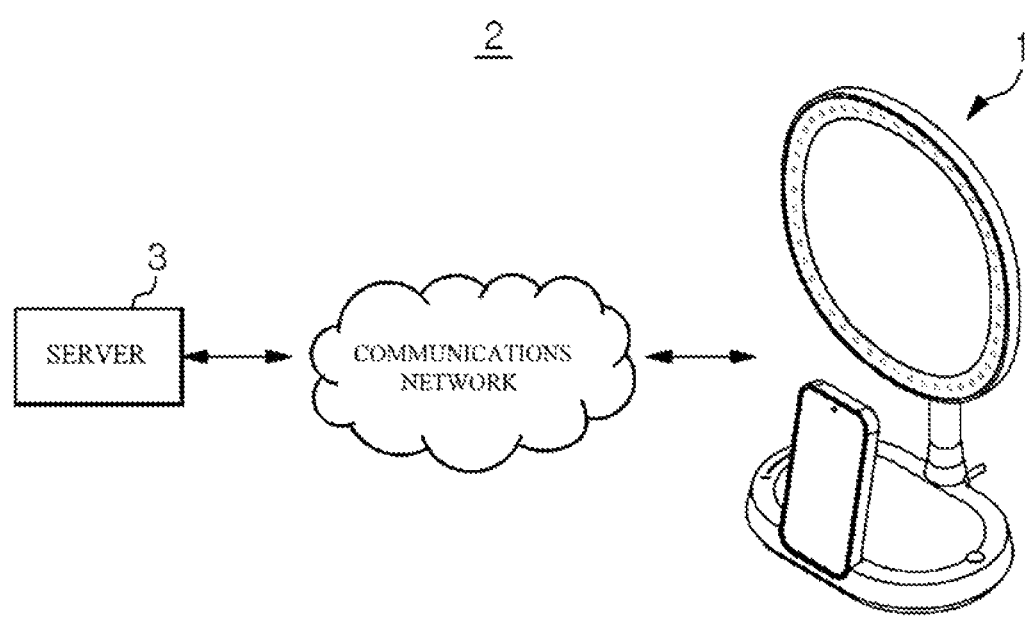

SMART MIRROR, CONTROLLING METHOD THEREOF, AND SYSTEM FOR PURCHASING A COSMETIC

CROSS-REFERENCE TO RELATED APPLICATION

This application is based on and claims priority of Korean Patent Application No. 10-2020-0119239, filed on Sep. 16, 2020 with the Korean Intellectual Property Office, the entire contents of which are hereby incorporated by reference.

TECHNICAL FIELD

One aspect of the present disclosure is relates to a smart mirror, a controlling method thereof, and a system for purchasing a cosmetic.

BACKGROUND

As consumers' interest in beauty increases, demands for accurate skin assessments and cosmetics suitable for their skin condition is increasing, and the desire to check correct color development during makeup (for example, color makeup) is also increasing.

In the case of skin assessments, when analyzing an image taken by a camera, the amount of light and the color temperature have a great influence on the skin tone measurements result. In addition, when evaluating the color development of color makeup products on skin, the color development seen through a mirror may look different depending on amount of light and color temperature. That is, lighting can have a big impact on evaluation of color development makeup products applied to skin and skin assessments.

Conventionally, there has been a cumbersome need to manually adjust the lighting states (light amount and the color temperature) during skin assessments and color makeup applications. In addition, when the lighting state is manually adjusted, it is difficult to provide an optimal lighting state (amount of light and the color temperature) suitable for skin assessments and color makeup applications.

Also, conventionally, there is a problem in that it is difficult to constantly adjust the lighting states applied to the user's face due to the external environment in which the mirror is placed or the change of the user's condition (for example, a shadow caused by the user's arm motion).

SUMMARY

Embodiments of the present disclosure are proposed to solve the above problems and an object of the present disclosure is to provide a user's skin (for example, a face) with lighting (light amount and the color temperature) that is optimized for various situations (for example, during skin diagnosis and color makeup) and has constant conditions for external changes, to provide a smart mirror capable of increasing the skin diagnosis or makeup effect and accuracy, and a controlling method thereof.

In addition, another object of the present disclosure is to provide a user's skin (for example, a face) with lighting (light amount and the color temperature) that is optimized according to a distance between the user and a lighting unit and an angle between the user and the lighting unit and has constant conditions for external changes, to provide a smart mirror capable of increasing skin diagnosis or makeup effect and accuracy, and a controlling method thereof.

In addition, another object of the present disclosure is to provide a system for purchasing a cosmetic that enables customers to purchase customized cosmetics according to skin diagnosis and skin diagnosis results.

According to an aspect of the present invention, there is provided a smart mirror comprising: a terminal unit including a sensor capable of recognizing a user; a lighting unit including an LED capable of irradiating light to the user; and a control module capable of controlling at least one of the amount of light and the color temperature of the light irradiated from the lighting unit so that the skin of the user indicates the light amount and the color temperature within a preset range by the light irradiated from the lighting unit.

Further, there is provided a smart mirror, wherein at least one of the terminal unit and the lighting unit is provided so that an angle can be adjusted, and wherein the control module may control the amount of light and the color temperature of the light irradiated from the LED of the lighting unit according to a position of the user transmitted from the terminal and the angle of the lighting unit.

Further, there is provided a smart mirror, wherein the control module includes: a relative position calculating unit capable of calculating a relative position of the user and the lighting unit; a relative angle calculating unit capable of calculating a relative angle between the user and the lighting unit; a light amount control unit for controlling the amount of light emitted from the lighting unit according to the relative position between the user and the lighting unit and the relative angle between the user and the lighting unit; and a color temperature control unit for controlling the color temperature of light emitted from the lighting unit according to the relative position between the user and the lighting unit and the relative angle between the user and the lighting unit.

Further, there is provided a smart mirror, wherein the lighting unit includes LEDs disposed in a plurality of areas, and wherein the control module includes: a lighting area control unit for controlling the light irradiated from the LEDs disposed in two or more areas among the LEDs disposed in the plurality of areas to represent different lights amount and the color temperatures.

Further, there is provided a smart mirror, wherein the control module includes: an angle control unit for controlling at least one of the angles of the terminal unit and the lighting unit.

Further, there is provided a smart mirror, wherein the lighting unit may operate in a plurality of modes in which the light irradiated from the LED represents different light amounts and the color temperatures, and wherein the plurality of modes includes: a skin diagnosis mode in which the user's skin is irradiated with light having a light amount of 500 Lux to 3000 Lux and a color temperature of 5000K to 6800K; and a makeup mode that allows the user's skin to be irradiated with light having a light amount of 300 Lux to 3000 Lux and a color temperature of 2000K to 8000K.

Further, there is provided a smart mirror, wherein the sensor is provided as a camera capable of photographing the user's skin, and wherein the control module is configured to control the amount of light and the color temperature of the light irradiated from the LED of the lighting unit so that the skin image taken by the camera can show a preset light amount and the color temperature.

Further, there is provided a smart mirror, wherein the lighting unit is divided into a plurality of areas including LEDs, and the LEDs arranged in at least two areas among the LEDs arranged in the plurality of areas may irradiate light having different amounts of light and the color temperature.

Further, there is provided a smart mirror further comprising: a mirror provided inside the lighting unit.

Further, there is provided a smart mirror, wherein the smart mirror further comprising a main body capable of supporting the terminal unit and the lighting unit, and wherein the main body includes: a lower body provided with a coupling unit capable of supporting the terminal unit; and an upper body extending upward from the lower body and capable of supporting the lighting unit.

Further, there is provided a smart mirror, wherein an angle between the lower body and the terminal is provided to be adjustable, and wherein an angle between the upper body and the lighting unit is provided to be adjustable.

According to another aspect of the present invention, there is provided an method of controlling a smart mirror comprising: receiving one of a plurality of modes as an input; determining a distance between a user and a lighting unit by a control module; determining a relative angle between the user and the lighting unit by the control module; calculating the amount of light and the color temperature of light emitted from the lighting unit according to the distance between the user and the lighting unit and the relative angle between the user and the lighting unit so that the user's skin represents the light amount and the color temperature in a range corresponding to the input mode; and emitting an LED of the lighting unit to indicate the calculated amount of light and the color temperature.

Further, there is provided a method, wherein the receiving one of the plurality of modes as the input includes: receiving one of a skin diagnosis mode, a makeup mode, and a selection mode through the terminal unit and transmitting one of the input skin diagnosis mode, the makeup mode, and the selection mode to the control module.

Further, there is provided a method, wherein the determining the distance between the user and the lighting unit includes: calculating a relative position of the user and the terminal by the control module; calculating a relative position of the lighting unit and the terminal unit by the control module; and calculating, by the control module, the distance between the user and the lighting unit from the relative position of the user and the terminal unit and the relative position of the lighting unit and the terminal unit.

Further, there is provided a method, wherein the determining the relative position of the lighting unit and the terminal unit includes; recognizing a position of the sensor provided to the terminal by the control module; and calculating the position of the sensor and the relative position of the lighting unit by the control module.

Further, there is provided a method, wherein the determining the relative angle between the user and the lighting unit includes: calculating the relative position of the user and the terminal by the control module; calculating the relative position of the lighting unit and the terminal unit by the control module; calculating, by the control module, the relative position between the user and the lighting unit from the relative position of the user and the terminal and the relative position of the lighting unit and the terminal unit; receiving an angle at which the light of the LED of the lighting unit is irradiated; and calculating a relative angle between the user and the lighting unit from the relative position between the user and the lighting unit and the angle at which the light irradiated from the LED of the lighting unit is irradiated.

According to another aspect of the present invention, there is provided a method of controlling a smart mirror comprising: receiving one of a plurality of modes as an input; determining a distance between a user and a lighting unit by a control module; determining a relative angle between the user and the lighting unit by the control module; calculating the amount of light and the color temperature of light emitted from the lighting unit according to the distance between the user and the lighting unit and the relative angle between the user and the lighting unit so that the user's skin represents the light amount and the color temperature in a range corresponding to the input mode; recognizing a shadow S appeared on the user's skin by the sensor of the terminal unit; correcting the calculated amount of light and the color temperature in consideration of the shadow by the control module; and emitting the LED of the lighting unit to indicate the corrected amount of light and the color temperature.

According to another aspect of the present invention, there is provided a system for purchasing a cosmetic comprising: a smart mirror; and a server capable of communicating with the smart mirror, wherein the smart mirror is provided to enable a user's skin diagnosis, the server includes a cosmetic database that can store cosmetic information matching a skin condition of the user diagnosed by the smart mirror, and the system for purchasing a cosmetic is provided to purchase cosmetics that match the user's skin condition through the smart mirror.

The smart mirror and controlling method thereof according to the embodiments of the present disclosure provide the user's skin (for example, a face) with lighting (light amount and the color temperature) that is optimized for various situations (for example, during skin diagnosis and color makeup) and has constant conditions for external changes, to provide an effect of increasing the skin diagnosis or makeup effect and accuracy.

In addition, it is an advantage of the present disclosure that increases the makeup effect and accuracy by providing the user's skin (for example, the user's face) with lighting (light amount and the color temperature) that is optimized according to the distance between the user and the lighting unit and the angle between the user and the lighting unit and has constant conditions for external changes.

In addition, the system for purchasing a cosmetic of the present disclosure has the advantage of being able to purchase customized cosmetics according to skin diagnosis and skin diagnosis results.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which:

FIG. 1 is a perspective view of a smart mirror according to an embodiment of the present disclosure;

FIG. 2 is an exploded perspective view of the smart mirror of FIG. 1;

FIG. 3 is a side view of the smart mirror of FIG. 1;

FIG. 4 is a view schematically showing the front of the lighting unit of the smart mirror of FIG. 1;

FIG. 5 is a diagram schematically illustrating a shadow that may appear on a user's face by an external environment;

FIG. 6 is a block diagram of a control module capable of controlling the terminal unit and the lighting unit of the smart mirror of FIG. 1;

FIG. 7 is a diagram illustrating an example of a display screen displayed on the terminal unit of FIG. 1;

FIG. 8 is a diagram illustrating another example of a display screen displayed on the terminal unit of FIG. 1;

FIG. 9 is a flowchart of a method for controlling a smart mirror according to an embodiment of the present disclosure;

FIG. 10 is a diagram conceptually illustrating the step S2 of determining a distance between the user and the lighting unit of FIG. 9;

FIG. 11 is a diagram conceptually illustrating a step S3 of determining a relative angle between the user and the lighting unit of FIG. 9;

FIG. 12 is a diagram conceptually illustrating a difference in light irradiated from a lighting unit according to a relative position of the user and the lighting unit and a relative angle between the user and the lighting unit;

FIG. 13 is a flowchart of a method for controlling a smart mirror according to an embodiment of the present disclosure;

FIG. 14 is a diagram schematically illustrating a system for purchasing a cosmetic including the smart mirror of FIG. 1;

DETAILED DESCRIPTION

Hereinafter, specific exemplary embodiments of this disclosure will be described in detail with reference to the drawings. Additionally, it is noted that in the description of the disclosure, the detailed description for known related configurations or functions may be omitted when it is deemed that such description may obscure essential points of the disclosure.

FIG. 1 is a perspective view of a smart mirror 1 according to an embodiment of the present disclosure, FIG. 2 is an exploded perspective view of the smart mirror 1 of FIG. 1, FIG. 3 is a side view of the smart mirror 1 of FIG. 1, FIG. 4 is a view schematically showing the front of the lighting unit 20 of the smart mirror 1 of FIG. 1, FIG. 5 is a view schematically showing a shadow that may appear on the user's face by the external environment, FIG. 6 is a block diagram of a control module 40 capable of controlling the terminal unit 10 and the lighting unit 20 of the smart mirror 1 of FIG. 1, FIG. 7 is a diagram illustrating an example of a screen of the display 14 displayed on the terminal unit 10 of FIG. 1, and FIG. 8 is a diagram illustrating another example of the screen of the display 14 displayed on the terminal unit 10 of FIG. 1.

Referring to FIGS. 1 to 8, the smart mirror 1 according to the embodiment of the present disclosure may include a terminal unit 10 including a sensor 12 capable of recognizing a user; a lighting unit 20 including an LED 22 that can irradiate light to the user; and a control module 40 capable of controlling at least one of the light amount and the color temperature of the light irradiated from the lighting unit 20 so that the user's body part can show the light amount and the color temperature within a preset range by the light irradiated from the lighting unit 20.

The smart mirror 1 of this embodiment can provide the user's skin (for example, a face) with lighting (light amount and the color temperature) that is optimized and has constant conditions for external changes, which are required for skin diagnosis. For example, the smart mirror 1 may determine the relative position of the lighting unit 20 and the user's body part (for example, a face) and the relative angle of the user's body part (for example, a face), and may adjust the amount of light and the color temperature of the light irradiated from the LED 22 of the lighting unit 20 so that the user's body part (for example, a face) exhibits a certain range of light amount and the color temperature optimized for skin diagnosis.

The range of the light amount optimized for skin diagnosis may be 500 Lux to 3000 Lux, and the range of the color temperature optimized for skin diagnosis may be 5000K to 6800K. Here, the light amount and the color temperature in the range optimized for skin diagnosis may be understood as the light amount and the color temperature appearing on the skin by the light irradiated from the lighting unit 20.

In this way, by using the lighting unit 20, it is possible to provide lighting (light amount and the color temperature) that is optimized and has constant conditions for external changes, which is required for skin diagnosis, so that accurate skin measurement can be made.

The skin measurement may be performed by photographing the user's skin with a camera provided by the terminal unit 10 and analyzing the photographed skin image, or may be performed through a separate skin measurement device.

In addition, the smart mirror 1 may automatically provide lighting (light amount and the color temperature) that is optimized and has constant conditions for external changes, which are required for makeup. For example, the smart mirror 1 may determine the relative position between the lighting unit 20 and the user's body part (for example, a face) and the relative angle between the lighting unit 20 and the user's body part (for example, a face), and may adjust the amount of light and the color temperature of the light irradiated from the LED 22 of the lighting unit 20 so that the user's body part (for example, a face) can be optimized and exhibit a certain range of light amount and the color temperature for external changes, which is required when confirming the color development of makeup.

In this case, the body part of the user reflected on the mirror 30 can represent a constant amount of light and the color temperature, so that the user can confirm the accurate color development state of the makeup.

The range of the amount of light optimized for confirming the color development may be 300 Lux to 3000 Lux, and the range of the color temperature optimized for confirming the color development may be from 2000K to 8000K. Here, the light amount and the color temperature optimized for confirming the color development and having a certain condition may be understood as the light amount and the color temperature appearing on the skin by the light irradiated from the lighting unit 20.

At least one of the terminal unit 10 and the lighting unit 20 may be provided to enable angle adjustment. For example, the terminal unit 10 and the lighting unit 20 may be provided to enable angle adjustment with respect to the main body 50, respectively, or only the lighting unit 20 may be provided to enable angle adjustment with respect to the main body 50, or only the terminal unit 10 may be provided to enable angle adjustment with respect to the main body 50.

In this embodiment, both the terminal unit 10 and the lighting unit 20 will be described as an example in which the angle can be adjusted independently.

Specifically, the terminal unit 10 may be provided to enable angle adjustment so that the sensor 12 can recognize the user's body part (for example, a face), In addition, the lighting unit 20 may be provided to enable angle adjustment so that the user can illuminate his or her body part (for example, a face) through the mirror 30 or the light irradiated from the LED 22 can be irradiated to his or her body part (for example, a face).

Angle adjustment of the terminal unit 10 and the lighting unit 20 may be controlled through the angle control unit 41 of the control module 40 to be described later. For example, the user's face can be recognized through the sensor 12 of the terminal unit 10 and the angle control unit 41 may adjust the angle of the lighting unit 20 so that and the user can see his or her face through the mirror 30. In addition, when the user moves, the user's face may be recognized in real time through the sensor 12 of the terminal unit 10, and the angle of the lighting unit 20 may be adjusted in real time by the angle control unit 41. However, the spirit of the present disclosure is not limited thereto, and may include manually adjusting the angles of the terminal unit 10 and the lighting unit 20 by the user.

The terminal unit 10 and the lighting unit 20 may be connected through the main body 50. However, the spirit of the present disclosure is not limited thereto, and may include that the terminal unit 10 and the lighting unit 20 are provided independently of each other rather than being connected through the main body 50.

The terminal unit 10 may be selectively coupled to the main body 50, and may be provided to allow an angle θ1 to be adjusted with respect to the main body 50. For example, the terminal unit 10 may be a smartphone or tablet device including a camera, and the camera may be understood as the sensor 12 of this embodiment.

The terminal unit 10 may include a sensor 12 capable of recognizing the user; and a display 14 capable of receiving information from the user or transmitting information to the user.

The sensor 12 may be one of a camera capable of photographing the user's skin, a distance sensor, and a motion sensor.

When the sensor 12 is provided as a camera, the user's skin may be photographed through the camera, and skin diagnosis may be performed based on the photographed image. In this case, the skin diagnosis may be performed according to an algorithm preset by the control module 40.

When analyzing skin images photographed by the camera during skin diagnosis, the amount of light and the color temperature taken has a great influence on the accuracy of skin diagnosis. In this embodiment, for accurate skin diagnosis, it is possible to provide the amount of light and the color temperature that are optimized through the lighting unit 20 and have constant conditions for external changes.

Specifically, the amount of light and the color temperature of the light emitted from the LED 22 of the lighting unit 20 can be adjusted so that the skin image taken by the camera is optimized and the light amount and the color temperature having constant conditions for external changes can be expressed. Here, it may be understood that the light amount and the color temperature indicated by the skin image photographed by the camera are the same as the light amount and the color temperature indicated by the photographed skin.

The amount of light and the color temperature indicated by the skin may vary depending on the distance between the user and the lighting unit 20 and/or the angle between the lighting unit 20 and the user.

Therefore, in order for the skin to represent the optimal light amount and the color temperature, the amount of light and the color temperature irradiated from the LED 22 of the lighting unit 20 may be changed depending on the distance between the user and the lighting unit 20 and/or the angle between the lighting unit 20 and the user.

The range of the optimal amount of light for skin diagnosis may be 500 Lux to 3000 Lux, preferably 500 Lux to 2000 Lux, and more preferably 500 Lux to 1500 Lux. In addition, the optimal the color temperature range for skin diagnosis may be 5000K to 6800K, preferably 5200K to 6800K, and more preferably 5300K to 6700K.

The range of the optimal amount of light for color development may be 300 Lux to 3000 Lux, preferably 300 Lux to 2000 Lux, and more preferably 300 Lux to 1800 Lux. In addition, the color temperature range optimized for color development may be 2000K to 8000K, preferably 4000K to 7000K, and more preferably 4600K to 7000K.

In addition, a display 14 may be provided on the front surface of the terminal unit 10, and information may be input from the user through the display 14 or information may be transmitted to the user.

One of a skin diagnosis mode, a makeup mode, and a selection mode, which will be described later, may be selected through the display 14.

When the selection mode is selected, the user may adjust the amount of light and the color temperature of the light irradiated from the lighting unit 20 through the display 14.

In addition, the amount of light and the color temperature of the light irradiated from the lighting unit 20 may be displayed on the display 14 of the terminal unit 10.

FIG. 7 shows an example of a screen of the display 14 that displays information on the lighting unit 20.

Referring to FIG. 7, the display 14 includes a color temperature adjusting unit 142 capable of inputting a color temperature of light emitted from the lighting unit 20; a light amount adjusting unit 144 capable of inputting the amount of light irradiated from the lighting unit 20; a power display unit 146 that can display whether the smart mirror 1 operates; and a light amount and the color temperature display unit 148 for displaying the light amount and the color temperature of the light irradiated from the lighting unit 20 (see FIG. 7).

In this embodiment, when the selection mode is selected, the amount of light and the color temperature can be adjusted through the terminal unit 10 as an example. However, the spirit of the present disclosure is not limited thereto, and when the selection mode is selected, the amount of light and the color temperature of the light irradiated from the lighting unit 20 can be adjusted through the lighting adjusting unit 58 provided in the main body 50.

Also, when the skin diagnosis mode is selected, skin diagnosis may be performed through the skin image taken by the sensor 12 of the terminal unit 10, and the skin diagnosis result may be displayed on the display 14.

FIG. 8 shows an example of a screen of the display 14 showing a user's skin diagnosis result.

Referring to FIG. 8, the display 14 includes a skin condition display unit 141 capable of displaying a skin condition after analyzing the skin image; and a skin condition progress unit 143 capable of displaying the skin condition over time.

The skin condition display unit 141 may display pigmentation, wrinkles, pores, erythema, and the like.

When the skin condition is diagnosed multiple times, the skin condition progress unit 143 may indicate the skin condition over time. In this case, the skin condition may be numerically displayed.

In addition, recommended cosmetics according to skin conditions may be displayed on the display 14 of the terminal unit 10, and when the recommended cosmetics are touched, it may be connected to a purchase shopping mall. A detailed description thereof will be given later.

In addition, the smart mirror 1 of this embodiment may include a main body 50 that can support the terminal unit 10 and the lighting unit 20.

Specifically, the body 50 may include a lower body 52 provided with a coupling part 51 capable of supporting the terminal part 10; and an upper body 54 extending upward from the lower body 52 to support the lighting unit 20.

In addition, the lighting unit 20, and a control module 40 capable of controlling at least one of the angles of the terminal unit 10 and the lighting unit 20 may be provided inside the main body 50. A description of the control module 40 will be described later.

The lower body 52 may be provided with a flat lower surface so that it can be seated on an external floor.

In addition, the lower body 52 may be provided to be heavier than the sum of the weights of the terminal unit 10, the lighting unit 20, and the mirror 30 so that the smart mirror 1 can stand stably.

A coupling unit 51 capable of supporting the terminal unit 10 may be provided on one side of the lower body 52. For example, the coupling unit 51 may be provided in the form of a concave groove into which the terminal unit 10 can be inserted.

The coupling unit 51 may be provided with a connection terminal (not shown) capable of being wired to the terminal unit 10.

In this case, when the terminal unit 10 is coupled to the coupling unit 51, the main body 50 and the terminal unit 10 communicate through the connection terminal, or the terminal unit 10 may be charged. However, the spirit of the present disclosure is not limited thereto, and the main body 50 and the terminal unit 10 may communicate wirelessly.

In addition, by the coupling unit 51 provided on the lower body 52, it may be provided so that the relative angle of the terminal unit 10 and the lower body 52 can be adjusted. Here, the angle between the terminal unit 10 and the lower body 52 may be understood as a first angle θ1.

For example, a rotating member 512 capable of rotating the terminal unit 10 may be provided on one side of the coupling unit 51.

In this case, the terminal unit 10 is coupled to the rotation member 512, and the angle θ1 of the terminal unit 10 may be adjusted according to the rotation of the rotation member 512. Here, the center of the rotating member 512 may be understood as the terminal rotating shaft M1.

In addition, the rotating member 512 may enter the lower body 52 while the terminal unit 10 is inserted into the coupling part 51, and after the terminal part 10 is seated in the coupling unit 51, may come out of the lower body 52. Through this process, the terminal unit 10 and the rotating member 512 may be coupled.

In addition, the coupling unit 51 may be provided with a rear wall 514 for supporting the rear side of the terminal unit 10.

The rear wall 514 may be moved to correspond to the angle adjustment of the terminal unit 10. For example, the rear wall 514 may support the rear side of the terminal unit 10 and may move in correspondence with the rotation angle of the terminal part 10.

In this embodiment, the shape of the coupling part 51 is described as, for example, a concave groove shape into which the terminal unit 10 can be inserted, but the spirit of the present disclosure is not limited thereto. For example, the coupling unit 51 may be provided in the form of a support that can support the terminal unit 10, and a gripping mechanism that can hold and fix the terminal unit 10.

The upper body 54 may be provided in the form of a rod extending upwardly from the lower body 52.

A lighting unit support 542 capable of moving the lighting unit 20 may be provided on the upper side of the upper body 54.

A universal joint that enables angle adjustment, rotation, and vertical movement of the lighting unit 20 may be provided inside the lighting unit support 542.

The lighting unit 20 may be provided to enable at least one of angle adjustment, rotation, and vertical movement with the upper body 54. Here, the angle adjustment may be understood as moving about the lighting unit rotation axis M2, the rotation may be understood as moving about the Z axis, and the vertical movement may be understood as moving parallel to the Z axis.

In this embodiment, the angle between the upper body 54 and the lighting unit 20 may be understood as the second angle θ2.

The lighting unit 20 may include a plurality of LEDs 22 capable of irradiating light.

A plurality of LEDs 22 provided in the lighting unit 20 may be arranged along the circumference of the mirror 30.

As such, when the LED 22 is disposed along the circumference of the mirror 30, light may be uniformly irradiated to the user's body part (for example, a face).

The lighting unit 20 may be operated so that the light irradiated from the LED 22 may exhibit different light amount and the color temperature. For example, the lighting unit 20 may be operated in one of a skin diagnosis mode, a makeup mode, and a selection mode.

When operating in the skin diagnosis mode, the user's skin may be irradiated with light having a light amount of 500 Lux to 3000 Lux and a color temperature of 5000K to 6800K.

When operating in the makeup mode, the user's skin may be irradiated with light having a light amount of 300 Lux to 3000 Lux and a color temperature of 2000K to 8000K.

When operating in the selection mode, light having a light amount and the color temperature set by the user may be irradiated.

The lighting unit 20 may be divided into a plurality of areas including the LED 22 (see FIG. 4).

The LEDs 22 disposed in at least two areas among the LEDs 22 disposed in the plurality of areas A, B, C, D, E, F, G, H, I, J, K, L may irradiate light having different amounts of light and the color temperature.

Accordingly, light having different amounts of light and the color temperature may be irradiated according to the shadow S generated on the user's body part (for example, a face) (refer to FIG. 5).

For example, when the user moves his arm during makeup, a shadow S may appear on the user's face, and the smart mirror 1 of this embodiment may recognize the shadow S and may control the lighting unit 20.

In addition, depending on which part of the user's body part (for example, a face) the external light illuminates, the shadow on the user's body part (for example, a face) may vary, and the smart mirror 1 of this embodiment may control the lighting unit 20 by recognizing such a shadow. A detailed description thereof will be given later.

In addition, the plurality of LEDs 22 may emit light to indicate different amount of light and the color temperature according to the position of the user and the angle of the lighting unit 20.

For example, when the distance between the user and the lighting unit 20 is long, the amount of light irradiated to the user may be reduced. In this case, as the distance between the user and the lighting unit 20 increases, the LED 22 of the lighting unit 20 may emit light strongly.

In addition, when the angle between the user and the lighting unit 20 increases, the amount of light irradiated to the user may decrease. In this case, as the angle between the user and the lighting unit 20 increases, the LED 22 of the lighting unit 20 may emit light strongly.

The light emission of the LED 22 of the lighting unit 20 may be controlled by the control module 40 to be described later, and a detailed description thereof will be described later.

The mirror 30 may be provided inside the lighting unit 20. The user may see his/her body part (for example, a face) through the mirror 30, and may do makeup while looking at the mirror 30. The smart mirror may have an additional mirror(s) with a magnification power. For example, the magnifying mirror(s) may have 5× magnification power or greater. The magnifying mirror(s) may be placed on one surface of the mirror 30.

In addition, the mirror 30 may be provided as a display panel that can receive a picture, a video, etc. reproduced from the terminal unit 10 and display it.

The control module 40 may control the light irradiated from the plurality of LEDs 22 of the lighting unit 20.

Depending on the distance between the user and the lighting unit 20 and the relative angle θ3 between the user and the lighting unit 20, the color temperature and the amount of light irradiated to the user's body part (for example, a face) may be lowered.

The control module 40 may calculate the distance between the user and the lighting unit 20 and the relative angle θ3 between the user and the lighting unit 20, and accordingly may control the amount of light and the color temperature of the light irradiated from the LED 22 of the lighting unit 20. The light of the lighting unit 20 may be irradiated to indicate the amount of light and the color temperature of the optimized and constant conditions for external changes required in the skin diagnosis mode and the makeup mode under the control of the control module 40.

Specifically, the control module 40 may include: a relative position calculating unit 42 for calculating the relative position of the user and the lighting unit 20; a relative angle calculating unit 44 for calculating the relative angle between the user and the lighting unit 20; a light amount control unit 46 for controlling the amount of light emitted from the lighting unit 20 according to the relative position between the user and the lighting unit 20 and the relative angle between the user and the lighting unit 20; and a color temperature control unit 48 for controlling the color temperature of light emitted from the lighting unit 20 according to the relative position between the user and the lighting unit 20 and a relative angle between the user and the lighting unit 20.

Here, the relative position calculating unit 42 may calculate the relative positions of the user and the terminal unit 10, may calculate the relative position of the lighting unit 20 and the terminal unit 10, and may calculate a distance between the user and the lighting unit 20 from the relative position of the user and the terminal unit 10 and the relative position of the lighting unit 20 and the terminal unit 10.

The relative angle calculating unit 44 may calculate the relative angle θ3 between the user and the lighting unit 20 from the relative position between the user and the lighting unit 20 and the irradiated angle of the light irradiated from the LED 22 of the lighting unit 20.

A specific process of controlling the amount of light and the color temperature of the light irradiated from the lighting unit 20 according to the distance between the user and the lighting unit 20 and the relative angle θ3 between the user and the lighting unit 20 by this control module 40 will be described later.

Also, the control module 40 may irradiate the light irradiated from the lighting unit 20 in consideration of the shadow S cast on the user's skin.

Specifically, the lighting unit 20 may be divided into a plurality of areas A, B, C, D, E, F, G, H, I, J, K, and L. In this case, the control module 40 may control the light irradiated from the LEDs 22 disposed in two or more areas among the LEDs 22 disposed in a plurality of areas to indicate different light amount and the color temperatures.

Such control may be understood as being controlled by the lighting area control unit 49 of the control module 40.

In addition, the control module 40 may include an angle control unit 41 for controlling at least one of the angles of the terminal unit 10 and the lighting unit 20.

For example, the sensor 12 of the terminal unit 10 may recognize the user's face, and the control module 40 controls the angle of the lighting unit 20 so that the lighting unit 20 and the user's face can form a preset angle.

It may be understood that the angle adjustment of the terminal unit 10 and the lighting unit 20 is controlled by the angle control unit 41.

FIG. 9 is a flowchart of a method for controlling a smart mirror according to an embodiment of the present disclosure, FIG. 10 is a diagram conceptually illustrating the step (S2) of determining the distance between the user and the lighting unit of FIG. 9, and FIG. 11 is a diagram conceptually illustrating the step (S3) of determining the relative angle between the user and the lighting unit of FIG. 9, and FIG. 12 is a diagram conceptually illustrating a difference in light irradiated from the lighting unit 20 according to the relative position of the user and the lighting unit 20, and the relative angle of the user and the lighting unit 20.

With reference to FIGS. 9 to 12, the above described method for controlling the smart mirror 1 will be described in detail.

According to one embodiment of the present disclosure, a smart mirror controlling method including steps of: receiving one of a plurality of modes as an input (S1); determining the distance between the user and the lighting unit by the control module 40 (S2); determining the relative angle between the user and the lighting unit by the control module 40 (S3); calculating the light amount and the color temperature of the light emitted from the lighting unit according to the distance between the user and the lighting unit and the relative angle between the user and the lighting unit so that the user's skin represents the light amount and the color temperature in the range corresponding to the above input mode (S4); and emitting the LED of the lighting unit to indicate the calculated amount of light and the color temperature (S5) may be provided. Such control of S2, S3, S4 and S4 may be executed by the control module 40.

Depending on the distance between the user and the lighting unit 20 and the relative angle θ3 between the user and the lighting unit 20, the color temperature and amount of light irradiated to the user's body part (for example, a face) may be lowered.

In this embodiment, the light irradiated from the lighting unit 20 may be adjusted according to the distance between the user and the lighting unit 20 and the relative angle θ3 between the user and the lighting unit 20. In the skin diagnosis mode and makeup mode, it may be possible to provide the light amount and the color temperature that is optimized for a user's body part (for example, a face) and is under constant conditions.

First, the step S1 of receiving one of the plurality of modes as an input will be described in detail as follows.

The plurality of modes may include a skin diagnosis mode, a makeup mode, and a selection mode.

The user may input one of the skin diagnosis mode, the makeup mode, and the selection mode through the terminal unit 10, and one of the input skin diagnosis mode, the makeup mode, and the selection mode may be transmitted to the control module 40.

When the skin diagnosis mode is selected, light that is optimized for skin diagnosis and indicates light amount and the color temperature under certain conditions may be irradiated through the lighting unit 20.

As described above, the amount of light optimized for skin diagnosis and having a constant condition may be 500 Lux to 3000 Lux, and the color temperature optimized for skin diagnosis and having the constant condition may be 5000K to 6800K. Here, the light amount and the color temperature optimized for skin diagnosis and having the certain condition may be understood as the light amount and the color temperature displayed on the skin by the light irradiated from the lighting unit 20.

In addition, when the skin diagnosis mode is selected, the sensor 12 provided in the terminal unit 10 may photograph the skin, and skin diagnosis may be performed based on the photographed skin image. At this time, by irradiating light toward the skin from the lighting unit 20, the photographed skin image may exhibit light amount and the color temperature optimized and having the constant condition.

When the makeup mode is selected, light indicating the light amount and the color temperature optimized for confirming the color development may be irradiated through the lighting unit 20.

As described above, the optimal amount of light may be 300 Lux to 3000 Lux when confirming color development, and the optimal the color temperature may be 2000K to 8000K when confirming color development. Similarly, the optimal light amount and the color temperature when confirming color development may be understood as the light amount and the color temperature indicated on the skin by the light irradiated from the lighting unit 20.

When the selection mode is selected, light indicating the amount of light and the color temperature set by the user may be irradiated through the lighting unit 20.

The amount of light and the color temperature may be adjusted by the display 14 of the terminal unit 10 or the lighting adjusting unit 58 provided in the main body 50.

Specifically, when the user inputs the desired light amount and the color temperature to the display 14 of the terminal unit 10, the light indicating the light amount and the color temperature input through the lighting unit 20 may be irradiated.

In addition, the user may adjust the lighting adjusting unit 58 provided in the main body 50 to irradiate the light indicating the amount of light and the color temperature desired by the user.

In the case of using such a selection mode, the smart mirror 1 has an advantage in being used as a sleeping light.

Next, the step S2 of determining the distance between the user and the lighting unit by the control module 40 will be described in detail (see FIG. 10).

The step S2 of determining the distance between the user and the lighting unit may include steps of calculating the relative position of the user and the terminal unit 10 by the control module 40 (S21); calculating the relative position of the lighting unit 20 and the terminal unit 10 by the control module 40 (S22); and calculating the distance between the user and the lighting unit 20 from the relative position of the user and the terminal unit 10 and the relative position of the lighting unit 20 and the terminal unit 10 by the control module 40.

In more detail with respect to the step S21, the user's body part (for example, a face) may be recognized by the sensor 12 of the terminal unit 10, and after transmitting the body part (for example, a face) recognized by the sensor 12 to the control module 40, the control module 40 may calculate the relative position between the sensor 12 and a body part (for example, a face).

In more detail with respect to the step S22, when the lighting unit 20 and the terminal unit 10 are connected through the main body 50, and the sensor 12 is located at a certain portion of the terminal unit 10, the relative position of the lighting unit 20 and the terminal unit 10 may be set to be constant.

In addition, the lighting unit 20 and the terminal unit 10 may not be connected through the main body 50 but may be provided independently of each other. In this case, the control module 40 may receive the position of the lighting unit 20 and the position of the sensor 12 of the terminal unit 10, and may calculate the relative position between the lighting unit 20 and the terminal unit 10.

In addition, even when the lighting unit 20 and the terminal unit 10 are connected through the main body 50, the terminal unit 10 having various sizes may be coupled to the coupling unit 51 of the terminal unit 10. In this case, the position of the sensor 12 provided to the terminal unit 10 may be set differently.

In this case, the control module 40 may recognize the position of the sensor 12 of the terminal unit 10 having various sizes.

When the position of the sensor 12 is recognized, the control module 40 may determine the relative position of the sensor 12 and the lighting unit 20.

In addition, the smart mirror 1 of this embodiment may include a database (not shown) for storing the types of the terminal unit 10.

The database (not shown) may store the location of the sensor 12 according to the type of the terminal unit (for example, a smart phone, a tablet device, etc.).

The control module 40 may recognize the terminal unit 10 connected to the main body 50 and determine the position of the sensor 12 corresponding to the type of each terminal unit 10 from the database.

In more detail with respect to the step S23, the control module 40 may calculate the distance between the user and the lighting unit 20 from the relative position of the user and the terminal unit 10 determined in the step S21 and the relative position of the lighting unit 20 and the terminal unit 10 determined in the step S22.

Next, the step S3 of determining the relative angle between the user and the lighting unit by the control module 40 will be described in detail (see FIG. 11).

The step S3 of determining the relative angle between the user and the lighting unit (S3) may include steps of calculating the relative position of the user and the terminal unit 10 by the control module 40 (S31); calculating the relative position of the lighting unit 20 and the terminal unit 10 by the control module 40 (S32); calculating, by the control module 40, the relative position between the user and the lighting unit 20 from the relative position of the user and the terminal unit 10 and the relative position of the lighting unit 20 and the terminal unit 10 (S33); receiving the angle at which the light of the LED 22 of the lighting unit 20 is irradiated (S34); calculating the relative angle $\theta 3$ between the user and the lighting unit 20 from the relative position between the user and the lighting unit 20 and the angle at which the light irradiated from the LED 22 of the lighting unit 20 is irradiated (S35).

The steps S31 and S32 are the same as the steps S21 and S22 as described above, respectively, and a detailed description thereof will be omitted.

Next, the step S4 of calculating the amount of light and the color temperature of the light emitted from the lighting unit according to the distance between the user and the lighting unit and the relative angle between the user and the lighting unit so that the user's skin represents the light amount and the color temperature in the range corresponding to the input mode will be described in detail.

The input mode may be one of the skin diagnosis mode, the makeup mode, and the selection mode.

In the skin diagnosis mode, light may be irradiated from the lighting unit 20 so that the user's skin exhibits a light amount of 500 Lux to 3000 Lux and a color temperature of 5000 k to 6800 k. In this case, the amount of light and the color temperature of the light irradiated from the lighting unit 20 may vary depending on the distance between the user and the lighting unit 20 and the relative angle θ3 between the user and the lighting unit 20. In this case, the value of the amount of light and the color temperature of the light irradiated from the lighting unit 20 may be calculated in consideration of the distance between the user and the lighting unit 20 and the relative angle θ3 between the user and the lighting unit 20.

In addition, in the makeup mode, light may be irradiated from the lighting unit 20 so that the user's skin exhibits the light amount of 300 Lux to 3000 Lux and the color temperature of 2000K to 8000K.

In the case of the selection mode, the amount of light and the color temperature of the light irradiated from the lighting unit 20 may vary according to a user's setting.

Next, the step S5 of emitting the LED of the lighting unit to indicate the calculated amount of light and the color temperature will be described in detail.

The control module 40 may control the light of the LED 22 irradiated from the lighting unit 20 to indicate the amount of light and the color temperature calculated in the step S4.

FIG. 13 is a flowchart of a method for controlling a smart mirror according to an embodiment of the present disclosure.

Referring to FIG. 13, the smart mirror 1 of this embodiment may be controlled. so that the light irradiated from the plurality of LEDs 22 is differently irradiated according to the shadow (brightness and darkness according to the shadow) appeared on the user's body part (for example, a face).

This embodiment may be understood to further include, after the step S4 of calculating the amount of light and the color temperature of the light emitted from the lighting unit according to the distance between the user and the lighting unit and the relative angle between the user and the lighting unit described above, steps of recognizing the shadow (S) appeared on the user's skin by the sensor 12 of the terminal unit 10 (S421); and correcting the amount of light and the color temperature of the light emitted from the lighting unit 20 in consideration of the shadow S by the control module 40 (S422).

Specifically, the controlling method of the smart mirror may include the steps of receiving one of the plurality of modes (S1'); determining the distance between the user and the lighting unit by the control module 40 (S2'); determining the relative angle between the user and the lighting unit by the control module 40 (S3'); calculating the light amount and the color temperature of the light emitted from the lighting unit according to the distance between the user and the lighting unit and the relative angle between the user and the lighting unit so that the user's skin represents the light amount and the color temperature in the range corresponding to the input mode (S4'); recognizing the shadow S appeared on the user's skin by the sensor 12 of the terminal unit 10 (S421); correcting the calculated amount of light and the color temperature in consideration of the shadow S by the control module 40 (S422); and emitting light of the LED 22 of the lighting unit 20 to indicate the corrected amount of light and the color temperature (S5').

The steps S1', S2', S3', and S4' are the same as S1, S2, S3, and S4 described above, and detailed description thereof will be omitted.

If the step S421 is described in more detail, the shadow S appeared on the user's skin may be recognized by the sensor 12 of the terminal unit 10.

A relatively dark area among the skin areas photographed by the sensor 12 may be recognized as the shadow S.

To describe step S422 in more detail, the lighting unit 20 may be divided into a plurality of areas (A, B, C, D, E, F, G, H, I, J, K, L), and the LEDs 22 in two or more areas among the LEDs 22 in the plurality of areas may be corrected to have different light amounts and the color temperatures.

In this embodiment, the lighting unit 20 is exemplified as being divided into 12 areas (A, B, C, D, E, F, G, H, I, J, K, L), but if the area in which the lighting unit 20 is divided is two or more, the number of the areas is not limited. Here, the area of the lighting unit 20 may be understood as a virtual area.

As shown in FIG. 5, when a shadow S is generated on the right part of the user's skin, the control module 40 may emit light so that LED 22 placed in the areas (A, B, C, D, E, F) corresponding to the right part of the plurality of areas (A, B, C, D, E, F, G, H, I, J, K, L) of the lighting unit 20 can display a brighter light than those placed in the areas (G, H, I, J, K, L) corresponding to the left.

FIG. 14 is a diagram schematically illustrating a system for purchasing a cosmetic 2 including the smart mirror 1 of FIG. 1.

According to an embodiment of the present disclosure, the system for purchasing the cosmetic 2 that can purchase the skin diagnosis and customized cosmetics according to the skin diagnosis result may be provided.

Specifically, the system for purchasing the cosmetic 2 may comprise a smart mirror 1; and a server 3 capable of communicating with the smart mirror 1, wherein the smart mirror 1 is provided to enable the user's skin diagnosis, and the server 3 includes a cosmetic database that can store cosmetic information matching the skin condition of the user diagnosed by the smart mirror 1, and the system may be provided so that cosmetics matching the skin condition of the user can be purchased through the smart mirror 1.

The user's skin image may be photographed through the sensor 12 of the terminal unit 10, and the skin may be diagnosed based on the photographed skin image. The skin diagnosis result by the smart mirror 1 may be transmitted to the server 3, and the skin diagnosis result may be matched with one or more cosmetic products information of the cosmetic products database of the server 3, and the matched cosmetic information may be displayed on the display 14 of the terminal 10. The form in which the cosmetic information is displayed on the display 14 of the terminal unit 10 may be provided as a variety of information such as a QR code, a cosmetic photo, and the like, and the user may purchase the recommended cosmetic by clicking on the recommended cosmetic information. In an embodiment, the skin diagnosis includes a skin color or tone measurement and the matching cosmetic product is a color makeup product such as a facial foundation product, eye color products, lip color products, or facial contouring makeup product.

The smart mirror 1 according to the embodiment of the present disclosure, controlling method thereof, and the system for purchasing the cosmetic including the same have been described as specific embodiments, but these are only examples, and the present disclosure is not limited thereto. The present disclosure should be construed as having the widest scope in accordance with the basic technical ideas disclosed herein. By combining or replacing a part or parts of embodiments disclosed herein, the ordinary skilled in the art may carry out a pattern of a shape which is not explicitly described herein, and however, it should be noted that it shall not depart from the scope of the disclosure. Besides, the ordinary skilled in the art may easily change or modify embodiments disclosed herein based on the disclosure, and however, it is obvious that such change or modification also falls within the scope of the disclosure.

The following is a list of embodiments of the above-described smart mirror 1, the controlling method thereof, and the system for purchasing the cosmetic including the same.

Item 1: According to an aspect of the present invention, there is provided a smart mirror comprising: a terminal unit including a sensor capable of recognizing a user; a lighting unit including an LED capable of irradiating light to the user; and a control module capable of controlling at least one of the amount of light and the color temperature of the light irradiated from the lighting unit so that the skin of the user indicates the light amount and the color temperature within a preset range by the light irradiated from the lighting unit.

Item 2: There is provided a smart mirror according to Item 1, wherein at least one of the terminal unit and the lighting unit is provided so that an angle can be adjusted, and wherein the control module may control the amount of light and the color temperature of the light irradiated from the LED of the lighting unit according to a position of the user transmitted from the terminal and the angle of the lighting unit.

Item 3: There is provided a smart mirror according to Item 1 and 2, wherein the control module includes: a relative position calculating unit capable of calculating a relative position of the user and the lighting unit; a relative angle calculating unit capable of calculating a relative angle between the user and the lighting unit; a light amount control unit for controlling the amount of light emitted from the lighting unit according to the relative position between the user and the lighting unit and the relative angle between the user and the lighting unit; and a color temperature control unit for controlling the color temperature of light emitted from the lighting unit according to the relative position between the user and the lighting unit and the relative angle between the user and the lighting unit.

Item 4: There is provided a smart mirror according to Item 1 to 3, wherein the lighting unit includes LEDs disposed in a plurality of areas, and wherein the control module includes: a lighting area control unit for controlling the light irradiated from the LEDs disposed in two or more areas among the LEDs disposed in the plurality of areas to represent different lights amount and the color temperatures.

Item 5: There is provided a smart mirror according to Item 1 to 4, wherein the control module includes: an angle control unit for controlling at least one of the angles of the terminal unit and the lighting unit.

Item 6: There is provided a smart mirror according to Item 1 to 5, wherein the lighting unit may operate in a plurality of modes in which the light irradiated from the LED represents different light amounts and the color temperatures, and wherein the plurality of modes includes: a skin diagnosis mode in which the user's skin is irradiated with light having a light amount of 500 Lux to 3000 Lux and a color temperature of 5000K to 6800K; and a makeup mode that allows the user's skin to be irradiated with light having a light amount of 300 Lux to 3000 Lux and a color temperature of 2000K to 8000K.

Item 7: There is provided a smart mirror according to Item 1 to 6, wherein the sensor is provided as a camera capable of photographing the user's skin, and wherein the control module is configured to control the amount of light and the color temperature of the light irradiated from the LED of the lighting unit so that the skin image taken by the camera can show a preset light amount and the color temperature.

Item 8: There is provided a smart mirror according to Item 1 to 7, wherein the lighting unit is divided into a plurality of areas including LEDs, and the LEDs arranged in at least two areas among the LEDs arranged in the plurality of areas may irradiate light having different amounts of light and the color temperature.

Item 9: There is provided a smart mirror according to Item 1 to 8 further comprising: a mirror provided inside the lighting unit.

Item 10: There is provided a smart mirror according to Item 1 to 9, wherein the smart mirror further comprising a main body capable of supporting the terminal unit and the lighting unit, and wherein the main body includes: a lower body provided with a coupling unit capable of supporting the terminal unit; and an upper body extending upward from the lower body and capable of supporting the lighting unit.

Item 11: There is provided a smart mirror according to Item 1 to 10, wherein an angle between the lower body and the terminal is provided to be adjustable, and wherein an angle between the upper body and the lighting unit is provided to be adjustable.

Item 12: According to another aspect of the present invention, there is provided an method of controlling a smart mirror comprising: receiving one of a plurality of modes as an input; determining a distance between a user and a lighting unit by a control module; determining a relative angle between the user and the lighting unit by the control module; calculating the amount of light and the color temperature of light emitted from the lighting unit according to the distance between the user and the lighting unit and the relative angle between the user and the lighting unit so that the user's skin represents the light amount and the color temperature in a range corresponding to the input mode; and emitting an LED of the lighting unit to indicate the calculated amount of light and the color temperature.

Item 13: There is provided a method according to Item 12, wherein the receiving one of the plurality of modes as the input includes: receiving one of a skin diagnosis mode, a makeup mode, and a selection mode through the terminal unit and transmitting one of the input skin diagnosis mode, the makeup mode, and the selection mode to the control module.

Item 14: There is provided a method according to Item 12 and 13, wherein the determining the distance between the user and the lighting unit includes: calculating a relative position of the user and the terminal by the control module; calculating a relative position of the lighting unit and the terminal unit by the control module; and calculating, by the control module, the distance between the user and the lighting unit from the relative position of the user and the terminal unit and the relative position of the lighting unit and the terminal unit.

Item 15: There is provided a method according to Item 12 to 14, wherein the determining the relative position of the lighting unit and the terminal unit includes; recognizing a position of the sensor provided to the terminal by the control module; and calculating the position of the sensor and the relative position of the lighting unit by the control module.

Item 16: There is provided a method according to Item 12 to 15, wherein the determining the relative angle between the user and the lighting unit includes: calculating the relative position of the user and the terminal by the control module; calculating the relative position of the lighting unit and the terminal unit by the control module; calculating, by the control module, the relative position between the user and the lighting unit from the relative position of the user and the terminal and the relative position of the lighting unit and the terminal unit; receiving an angle at which the light of the LED of the lighting unit is irradiated; and calculating a relative angle between the user and the lighting unit from the relative position between the user and the lighting unit and the angle at which the light irradiated from the LED of the lighting unit is irradiated.

Item 17: According to another aspect of the present invention, there is provided a method of controlling a smart mirror comprising: receiving one of a plurality of modes as an input; determining a distance between a user and a lighting unit by a control module; determining a relative angle between the user and the lighting unit by the control module; calculating the amount of light and the color temperature of light emitted from the lighting unit according to the distance between the user and the lighting unit and the relative angle between the user and the lighting unit so that the user's skin represents the light amount and the color temperature in a range corresponding to the input mode; recognizing a shadow S appeared on the user's skin by the sensor of the terminal unit; correcting the calculated amount of light and the color temperature in consideration of the shadow by the control module; and emitting the LED of the lighting unit to indicate the corrected amount of light and the color temperature.

Item 18: According to another aspect of the present invention, there is provided a system for purchasing a cosmetic comprising: a smart mirror according to Item 1 to 11; and a server capable of communicating with the smart mirror, wherein the smart mirror is provided to enable a user's skin diagnosis, the server includes a cosmetic database that can store cosmetic information matching a skin condition of the user diagnosed by the smart mirror, and the system for purchasing a cosmetic is provided to purchase cosmetics that match the user's skin condition through the smart mirror.

REFERENCE SIGN LIST

1: smart mirror
2: system for purchasing a cosmetic
10: terminal unit
20: lighting unit
30: mirror
40: control module
50: main body

What is claimed is:

1. A smart mirror comprising:
 a terminal unit including a sensor for recognizing a user;
 a lighting unit including a light emitting device (LED) for irradiating light to the user;
 a mirror; and
 a control module for controlling an amount of the light emitted from the lighting unit and/or color temperature of the light emitted from the lighting unit so that the light amount and the color temperature of an image of skin of the user acquired by the sensor fall within a preset range, wherein the control module includes:
 a relative position calculating unit for calculating a distance of the user and the lighting unit;
 a relative angle calculating unit for calculating an angle between an imaginary vertical line of the user and an imaginary vertical line of the lighting unit;
 a light amount control unit for controlling the amount of the light emitted from the lighting unit according to the distance calculated by the relative position calculating unit and the angle calculated by the relative angle calculating unit; and
 a color temperature control unit for controlling the color temperature of the light emitted from the lighting unit according to the distance calculated by the relative position calculating unit and the angle calculated by the relative angle calculating unit.

2. The smart mirror of claim 1, wherein the lighting unit includes a plurality of areas each provided with the LED, and
 wherein the control module includes:
 a lighting area control unit for controlling the light emitted from the LEDs disposed in two or more of the plurality of areas to provide different lights amount and/or different color temperatures.

3. The smart mirror of claim 1, wherein the lighting unit operates in a plurality of modes in which the light amount and the color temperature of the light emitted from the LED differ, and wherein the plurality of modes includes:
 a skin assessment mode in which the user's skin is irradiated with light having a light amount of 500 Lux to 3000 Lux and a color temperature of 5000K to 6800K; and
 a makeup mode in which the user's skin is irradiated with light having a light amount of 300 Lux to 3000 Lux and a color temperature of 2000K to 8000K.

4. The smart mirror of claim 1, wherein the sensor is a camera lens capable for photographing the user's skin, and
 wherein the control module is configured to control the amount of light and the color temperature of the light emitted from the LED so that the light amount and the color temperature of the user skin image acquired by the camera lens are in preset ranges.

5. The smart mirror of claim 1, wherein the lighting unit comprises a plurality of areas each provided with the LED, and the respective LEDs emit light having different amounts of light and color temperature from each other.

6. The smart mirror of claim 1, wherein the mirror is housed by the lighting unit.

7. The smart mirror of claim 1, wherein the smart mirror further comprises
 a main body for supporting the terminal unit and the lighting unit, and wherein the main body includes:
 a lower body provided with a coupling unit for supporting the terminal unit; and
 an upper body extending upward from the lower body and for supporting the lighting unit.

8. The smart mirror of claim 7, wherein an angle between a vertical axis of the lower body and a vertical axis of the terminal is adjustable, and
wherein an angle between a vertical axis of the upper body and a vertical axis of the lighting unit is adjustable.

9. A system for purchasing a cosmetic product comprising:
a smart mirror according to claim 1; and
a server for communicating with the smart mirror,
wherein the smart mirror is provided to enable a user's skin assessment,
the server includes a cosmetic database that stores cosmetic product information matching a skin condition of the user assessed by the smart mirror, and
the system for purchasing a cosmetic product is provided to purchase cosmetic product that matches the user's skin condition through the smart mirror.

10. The system of claim 9, wherein the skin assessment comprises a skin color measurement and the cosmetic product comprises a color makeup product.

11. The smart mirror of claim 1, which further comprises an additional mirror that is a magnifying mirror.

12. A smart mirror comprising:
a terminal unit including a sensor for recognizing a user;
a lighting unit including a light emitting device (LED) for irradiating light to the user;
a mirror; and
a control module for controlling an amount of the light emitted from the lighting unit and/or color temperature of the light emitted from the lighting unit so that the light amount and the color temperature of an image of skin of the user acquired by the sensor fall within a preset range, wherein either or both of the terminal unit and the lighting unit is configured to adjust their angle with respect to a horizontal axis of the smart mirror, and wherein
the control module is capable of controls the amount of light and the color temperature of the light emitted from the lighting unit according to information of a position of the user transmitted from the terminal and the angle of the lighting unit wherein the control module includes:
an angle control unit for controlling either or both of the angles of the terminal unit and the lighting unit.

13. A method of controlling a smart mirror comprising:
receiving one of a plurality of modes as an input;
determining a distance between a user and a lighting unit by a control module;
determining a relative angle between an imaginary vertical line of the user and an imaginary vertical line of the lighting unit by the control module;
calculating the amount of light and the color temperature of light to be emitted from the lighting unit, which allows light amount and color temperature of an image of user's skin to be acquired by a sensor fall in a range preset corresponding to the received input mode, according to the distance determined by the control module and the relative angle determined by the control module; and
emitting light from a light emitting device (LED) of the lighting unit at the calculated amount of light and the calculated color temperature.

14. The method of claim 13, wherein the receiving one of the plurality of modes as the input includes:
receiving one of a skin assessment mode, a makeup mode, and a selection mode through the terminal unit and transmitting one of the input skin assessment mode, the makeup mode, and the selection mode to the control module.

15. The method of claim 13, wherein the determining the distance between the user and the lighting unit includes:
calculating a relative position of the user and the terminal by the control module;
calculating a relative position of the lighting unit and the terminal unit by the control module; and
calculating, by the control module, the distance between the user and the lighting unit from the relative position of the user and the terminal unit and the relative position of the lighting unit and the terminal unit.

16. The method of claim 13, wherein the determining the relative position of the lighting unit and the terminal unit includes
recognizing a position of the sensor provided in the terminal by the control module; and
calculating the position of the sensor and the relative position of the lighting unit by the control module.

17. The method of claim 13, wherein the determining the relative angle between the user and the lighting unit includes:
calculating the relative position of the user and the terminal by the control module;
calculating the relative position of the lighting unit and the terminal unit by the control module;
calculating, by the control module, the relative position between the user and the lighting unit from the relative position of the user and the terminal and the relative position of the lighting unit and the terminal unit;
receiving an angle at which the light of the LED of the lighting unit is irradiated; and
calculating a relative angle between the user and the lighting unit from the relative position between the user and the lighting unit and the angle at which the light irradiated from the LED of the lighting unit is irradiated.

18. The method of claim 13, further comprising
recognizing a shadow appeared on an image of the user's skin, said image being acquired by the sensor of the terminal unit;
correcting the calculated amount of light and the color temperature in consideration of the shadow by the control module; and
emitting light from a light emitting device (LED) of the lighting unit at the corrected amount of light and the color temperature.

* * * * *